2,899,454

FLUORINE-CONTAINING PHOSPHONATES

Earl T. McBee, West Lafayette, Ind., Ogden R. Pierce, Midland, Mich., and Hyman Maior Metz, Fair Lawn, N.J., assignors, by mesne assignments, to Research Corporation, New York, N.Y., a corporation of New York No Drawing. Application February 9, 1955
Serial No. 487,216

14 Claims. (Cl. 260—461)

This invention relates to a group of novel organic compounds designated as fluorine-containing phosphonates and to processes by which they can be made, and is more particularly concerned with dialkyl alkane phosphonates (which are, under an alternative system of nomenclature, also called dialkyl alkylphosphonates) wherein one, two, or all of the alkyl groups contain a lower-perfluoroalkyl radical.

The fluorine-containing dialkyl alkylphosphonates of the present invention may be illustrated by the following formula:

$$RPO(OR')_2$$

wherein R and R' represent alkyl groups and either R or R', or both, are lower-perfluoroalkyl-substituted-alkyl groups. Among the lower-perfluoroalkyl groups which may be substituted are those having from 1 to about 8 carbon atoms. These phosphonates may be thought of as esters of a phosphonic acid having the formula $RPO(OH)_2$ wherein R is an alkyl group or a lower-perfluoroalkyl-substituted alkyl group.

The compounds of the present invention are usually liquids boiling at about 38 to 80 degrees centigrade at pressures below 4 millimeters. They are useful as chemical intermediates in making the respective fluorine-containing phosphonic acids by hydrolysis. They are also useful as lubricating and hydraulic fluid additives.

The synthesis of these novel lower-perfluoroalkyl-substituted dialkyl alkylphosphonate esters $RPO(OR')_2$ has been accomplished by two procedures:

*Method A.*—By the reaction of an organolithium compound with a tris(fluorine-containing alkyl)phosphite, and oxidation of the unstable phosphonite ester thus obtained directly to the phosphonate ester, without isolation of the phosphonite ester. The overall reaction is believed to go in accordance with the following equations:

(1)        $RLi + P(OR')_3 \rightarrow RP(OR')_2 + LiOR'$ 
(2)        $RP(OR')_2 + O_2 \rightarrow RPO(OR')_2$ wherein R and R' are as above-defined.

Step 1 is usually conducted over a period of six hours at the temperature of refluxing ether. During this period a white precipitate usually forms and the color of the reaction mixture generally changes gradually from the color of the organolithium compound, usually a blue-grey, to yellow. The reaction product of step 1 is oxidized preferably with air rather than oxygen because of the possibility of explosions when pure oxygen is used.

It has been found that higher yields may be obtained by the use of a high-boiling inert hydrocarbon, which acts as a heat transfer medium and also as a "pusher" to help distill the desired ester from the solid residue of the reaction. The high-boiling inert hydrocarbon is added to the reaction mixture after step 1 and prior to step 2. Among the suitable high-boiling inert hydrocarbons which may be used are those boiling higher than the desired esters such as triamylbenzene and octylmethylnaphthalene.

It is preferred to dissolve both the initial reactants in a solvent such as anhydrous ether, tetrahydrofuran, dioxane and the like to moderate and control the reaction.

While the organolithium compound and the tris-(fluorine-containing alkyl)phosphite may be reacted in approximately equimolar amounts, higher yields have been obtained using an excess of the organolithium compound such as a molar ratio of 10:7.

When the organolithium compound used contains no fluorine, the reaction product is a bis-(fluorine-containing alkyl) alkylphosphonate. Another reaction product which is sometimes formed is a fluorine-containing alkyl dialkylphosphonate. This latter phosphonate is often difficult to isolate in pure form but is believed to usually be present as a reaction product.

When the organolithium compound used does contain fluorine, the reaction product is a bis-(fluorine-containing alkyl) (fluorine-containing alkyl) phosphonate.

*Method B.*—The second method of synthesis is by the reaction of an alkyl Grignard reagent with a bis-(fluorine-containing alkyl) halophosphate, as shown in the following equation:

$$RMgX + XPO(OR')_2 \rightarrow RPO(OR')_2 + MgX_2$$ 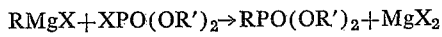

wherein R and R' represent alkyl groups and either R, R', or both R and R', is a lower-perfluoroalkyl-substituted alkyl group, and X represents a halogen. In general slightly better yields may be obtained by this method.

The Grignard reagent usually preferred is the bromide, since use of the iodide liberates iodine which may interfere with the reaction product. The preferred halophosphate is the chlorophosphate.

The Grignard reagent and the halophosphate may be reacted in approximately equimolar amounts but better yields may be obtained using a slight excess of the Grignard reagent. It is preferred to dissolve both the reactants in a solvent such as anhydrous ether, tetrahydrofuran, dioxane, et cetera, because the refluxing solvent assists in controlling the reaction temperature.

When the Grignard reagent used contains no fluorine, the reaction product is a bis-(fluorine-containing alkyl) alkylphosphonate. Another reaction product which is sometimes formed is a fluorine-containing alkyl dialkylphosphonate. This latter phosphonate is often difficult to isolate in pure form but is believed to be usually present as a reaction product.

When the Grignard reagent does contain fluorine, the reaction product is a di-(fluorine-containing alkyl) (fluorine-containing alkyl)phosphonate.

The reaction may be conducted by adding the Grignard reagent in ether slowly to the halophosphate in ether which is cooled with an ice-bath and stirred. The solution will usually then be the color of the Grignard reagent. The ice-bath is then removed and the reaction mixture stirred. The color of the solution gradually changes. After a few hours, the stirring is stopped but the refluxing is continued for an additional eight to sixteen hours. The mixture is then cooled and hydrolyzed with a dilute acid. The reaction products are then obtained by distillation at reduced pressure.

The following examples indicate two novel methods by which members of the new group of compounds may be prepared, but are in no way to be construed as limiting the invention thereto.

The examples whose number begins with A– are illustrative of Method A. The examples numbered B– are illustrative of Method B.

PREPARATION 1.—2,2,2-TRIFLUOROETHANOL

Under a fume hood, a 5000-milliliter three-necked flask equipped with a Hershberg stirrer, a Dry Ice condenser fitted with a rubber tube leading to a drying tube in the back of the fume hood and a gas-inlet tube was connected to a 1000-milliliter three-necked flask equipped with a 125-milliliter additional funnel, a Trubore stirrer, and a column packed with ⅛ inch Pyrex helices fitted with a reflux condenser by a Tygon-tubing connection between the gas inlet tube and the reflux condenser. Four pounds of anhydrous ether was charged into the larger flask, which was cooled in an ice-bath at all times. To the stirred ether, 83.6 grams (2.2 moles) of lithium aluminum hydride which had been rapidly crushed and weighed, was added. The smaller flask was charged with 562 grams (4.0 moles) of benzoyl chloride and 228 grams (2.0 moles) of trifluoroacetic acid was placed in the dropping funnel. The benzoyl chloride was stirred slowly and heated to 90 degrees centigrade, at which temperature the trifluoroacetic acid was added dropwise. The addition required four hours and the reaction was evidenced by the appearance of clouds of vapor in the larger flask (due to trifluoroacetyl chloride which was generated by the reaction in the smaller flask). At the end of the four-hour addition period, the temperature of the reaction mixture in the smaller flask was raised gradually to 190 degrees centigrade during one hour and was maintained at this temperature for an additional hour until no more vapor was noted in the larger flask. The connection between the flasks was then broken and the Dry Ice condenser and the gas inlet tube were removed from the larger flask and were replaced with a regular water-cooled condenser and an addition funnel containing 100 milliliters of water. The rubber tube to the back of the hood was now fitted to the water-cooled condenser and stirring and cooling of the mixture were continued. The water was added very slowly over a period of one and one-half hours, allowing fifty minutes to add the first thirty milliliters. The hydrolyzed product was poured onto four batches of sulfuric acid solution, each prepared by adding 110 milliliters of concentrated sulfuric acid to one kilogram of ice. The ether layers were separated and the acid layers were extracted in two batches with ether, using 200 milliliters of ether per extraction. Each batch was extracted three times and the combined ether layers were dried over Drierite for a period of thirty-six hours. The ether was removed by distillation from a Vigreux column and the residue was rectified through a Todd precise fractionation apparatus packed with Pyrex helices. There was thus obtained 152.8 grams of $CF_3CH_2OH$ (76.8 percent of the theoretical yield) boiling at 73° C./750 mm.

PREPARATION 2.—TRIS-(2,2,2-TRIFLUOROETHYL) PHOSPHITE

A 500-milliliter, three-necked flask equipped with a 125-milliliter addition funnel, a Trubore stirrer and a reflux condenser fitted with a drying tube containing Drierite was flamed dry. The apparatus was allowed to cool. Then 150 grams (1.50 moles) of 2,2,2-trifluoroethanol was placed in the flask and 68.7 grams (0.50 mole) of phosphorus trichloride was placed in the dropping funnel. The flask was cooled with an ice-bath and the phosphorus trichloride was added to the stirred trifluoroethanol during a period of 40 minutes. The ice-bath was removed and the reaction mixture was heated at 60 degrees centigrade for a period of three hours in order to remove as much hydrogen chloride gas as possible. The product was rectified under reduced pressure. There was thus obtained 170 grams of $(CF_3CH_2O)_3P$ (approximately 79.5 percent of the theoretical yield) boiling at 51° C./10 mm., having a refractive index ($n_D^{20}$) of 1.3250.

PREPARATION 3.—BIS-(2,2,2-TRIFLUOROETHYL) CHLOROPHOSPHATE

A one-liter, three-necked flask equipped with a 500-milliliter funnel, a Trubore stirrer and a reflux condenser fitted with a drying tube containing Drierite was flamed dry and allowed to cool. The flask was then charged with 107.5 grams (—0.7 mole) of phosphorus oxychloride and 150 milliliters of anhydrous ether. The flask was cooled with an ice bath. A mixture of 140 grams (1.40 moles) of 2,2,2-trifluoroethanol and 110.6 grams (1.40 moles) of pyridine in 100 milliliters of anhydrous ether was added dropwise to the stirring phosphorus oxychloride solution during a period of two hours. Pyridine hydrochloride precipitated immediately from the ether solution. When the addition was complete, the mixture was allowed to stir at room temperature for one hour. Then the pyridine hydrochloride was removed by suction filtration and was washed several times with anhydrous ether. The ether was removed from the combined filtrates by distillation from a Vigreux column and the residue was rectified. There was thus obtained 126.8 grams (approximately 64.5 percent of the theoretical yield of $(CF_3CH_2O)_2POCl$ boiling at 45° C./5 mm., having a refractive index ($n_D^{20}$) of 1.3340.

*Example A–1.—Bis-(2,2,2-trifluoroethyl)-n-butylphosphonate and 2,2,2-trifluoroethyl dibutylphosphonate*

The apparatus used consisted of a 500-milliliter three-necked flask fitted with a 125-milliliter addition funnel connected to a source of nitrogen gas, a Trubore stirrer and a thermometer well with pentane thermometer; a 1000-milliliter three-necked flask fitted with a 500-milliliter addition funnel, a Trubore stirrer and a reflux condenser connected to a source of nitrogen gas; the thermometer well being connected to the 500-milliliter addition funnel by a Tygon connection and a glass connector. The apparatus was flamed dry in a stream of nitrogen gas. Then 6.9 grams (1.0 gram atom) of lithium metal wire was rapidly washed with ether, weighed and cut in the smaller flask in a stream of nitrogen gas. The lithium was covered with 150 milliliters of anhydrous ether, and 54.88 grams (0.4 mole) of n-butyl bromide in 100 milliliters of anhydrous ether was placed into the 125-milliliter addition funnel. The system was placed under nitrogen atmosphere and stirring was begun in the smaller flask. A small amount (30 drops) of the butyl bromide solution was added to the lithium metal and, after the reaction had started, the smaller flask was cooled to —10 degrees centigrade with a Dry Ice-chloroform-carbon tetrachloride bath kept at —40 degrees centigrade. The addition of the bromide solution was resumed at such a rate as to keep the temperature in the solution between —10 degrees centigrade and —15 degrees centigrade; the addition required one hour. The Dry Ice bath was removed, the flask was warmed with an ice-bath and the solution was stirred at ice temperature for one and one-half hours. During this period, 92 grams (0.28 mole) of tris-(2,2,2-trifluoroethyl) phosphite in 150 milliliters of anhydrous ether was added to the larger flask. At the end of the stirring period, the organolithium solution was transferred to the 500-milliliter addition funnel under nitrogen pressure. The larger flask was placed under a nitrogen atmosphere and was cooled in an ice-bath. The n-butyl-lithium solution was added to the stirred phosphite during a period of 20 minutes, the ice-bath was removed and the reaction mixture was refluxed for six hours. At the beginning, the solution was cloudy and blue-grey in color, but it gradually changed to yellow and a precipitate formed. The mixture was allowed to stand overnight at room temperature and then the ether was removed by distillation from a Vigreux column. Then 60 milliliters of triamylbenzene was added to the residue and the mixture was distilled at two millimeters' pressure through a Claisen head. The pot temperature was not higher than 120 degrees centigrade. All of the liquid thus collected was placed in a dried 100-milliliter, three-necked flask equipped with a gas inlet tube, a Trubore stirrer and a condenser protected with a drying tube packed with Drierite. Air which had been dried with sulfuric acid was passed at a slow rate over the stirred liquid. The mixture warmed up considerably as soon as the air was passed in and the reaction was continued until the flask had cooled to room temperature which required three hours. The product was then rectified. There was thus obtained 14.3 grams (16.9 percent) of bis-(2,2,2-trifluoroethyl) n-butane phosphonate (alternatively called bis-(2,2,2-trifluoroethyl) n-butylphosphonate) boiling at 53–53.3° C./2 mm., having a refractive index ($n_D^{20}$) of 1.3310 and a specific gravity ($d_{20}^{20}$) of 1.387

*Analysis.* — Calculated for n-$C_4H_9PO(OCH_2CF_3)_2$: C, 31.81; H, 4.34; P, 10.26. Found: C, 31.84; H, 4.06; P, 10.37.

There was also obtained 4.5 grams (about 6 percent of the theoretical yield of dibutyl 2,2,2-trifluoroethane phosphonate (alternatively called 2,2,2-trifluoroethyl dibutylphosphonate), boiling at 80–81° C./1 mm., having a refractive index ($n_D^{20}$) of 1.4081.

*Example A–2.—Bis-(2,2,2-trifluoroethyl) methylphosphonate*

Using the apparatus of Example A–1, except that a reflux condenser was substituted for the thermometer well (the reflux condenser was connected to the glass connector by a Tygon connection as in Example A–1) and no Dry Ice bath was used, 6.9 grams (1 gram atom) of lithium metal wire was placed in the smaller flask after the apparatus was flamed dry and allowed to cool. The lithium was covered with 150 milliliters of anhydrous ether, and 56.8 grams (0.4 mole) of methyl iodide dissolved in 100 milliliters of anhydrous ether was placed into the 125-millimeter addition funnel. The system was flushed with nitrogen and stirring was begun in the smaller flask. The methyl iodide solution was added at such a rate to maintain gentle refluxing of the ether; the addition required two hours. The mixture was allowed to stir for one hour at room temperature. Then the organolithium solution was transferred to the 500-milliliter addition funnel under nitrogen pressure (as in Example A–1). The larger flask had been charged with 92 grams (0.28 mole) of tris-(2,2,2-trifluoroethyl) phosphite dissolved in 150 milliliters of anhydrous ether (as in Example A–1). The remaining steps of the reaction were carried out according to the procedure of Example A–1.

There was thus obtained approximately 10 percent of the theoretical yield of bis-(2,2,2-trifluoroethyl) methylphosphonate, boiling at 51–52° C./4 mm. having a refractive index ($n_D^{20}$) of 1.3387.

*Analysis.* — Calculated for $CH_3PO(OCH_2CF_3)_2$: C, 23.07; H, 2.71; P, 11.91. Found: C, 22.98; H, 2.72; P, 11.81.

*Example A–3.—Bis-(2,2,2-trifloroethyl) ethylphosphonate*

Following the procedure of Example A–1, but reacting ethyllithium obtained by the reaction of 43.6 grams (0.4 mole) of ethyl bromide with 7.0 grams (about 1 gram atom) of lithium metal with 64 grams (0.195 mole) of tris-(2,2,2-trifluoroethyl) phosphite, there was obtained 5.75 grams (about 11 percent) of the product boiling at 41° C./1 mm. having a refractive index ($n_D^{20}$) of 1.3440 and a specific gravity ($d_{20}^{20}$) of 1.574

*Analysis.*—Calculated for $C_2H_5PO(OCH_2CF_3)_2$: C, 26.20; H, 3.28; P, 11.25. Found: C, 25.65; H, 3.34; P, 10.11

*Example A–4.—Bis-(2,2,2-trifluoroethyl) propylphosphonate*

Following the procedure of Example A–1, but reacting propyllithium obtained by the reaction of 49.2 grams (0.4 mole) of n-propyl bromide and 7 grams (approximately 1 gram atom) of lithium metal with 77 grams (0.235 mole) of tris-(2,2,2-trifluoroethyl) phosphite, there was obtained about 12 percent of the theoretical yield of bis-(2,2,2-trifluoroethyl) propylphosphonate boiling at 50–53° C./1 mm., having a refractive index ($n_D^{20}$) of 1.3526.

*Analysis.*—Calculated for n-$C_3H_7PO(OCH_2CF_3)_2$: C, 29.16; H, 3.88. Found: C, 29.33; H, 3.99.

*Example A–5.—Bis-(2,2,2-trifluoroethyl) isobutylphosphonate*

Following the procedure of Example A–1, but reacting isobutyllithium made from 54.8 grams (0.4 mole) of isobutyl bromide and 7 grams (about 1 gram atom) of lithium metal with 69 grams of tris-(2,2,2-trifluoroethyl) phosphite there was obtained about 18 percent of the theoretical yield of the product, boiling at 63–64° C./2 mm., having a refractive index ($n_D^{20}$) of 1.3585.

*Analysis.* — Calculated for iso-$C_4H_9PO(OCH_2CF_3)_2$: C, 31.81; H, 4.34; P, 10.26. Found: C, 31.48; H, 4.04; P. 10.22.

*Example A–6.—Bis-(2,2,2-trifluoroethyl) 3,3,4,4,5,5,5-heptafluoropentylphosphonate*

Following the procedure of Example A–1, but reacting 3,3,4,4,5,5,5-heptafluoropentyllithium obtained by the reaction of 50 grams (0.181 mole) of heptafluoropentyl bromide and 3.5 grams (about 0.5 gram atom) of lithium metal wire with 32.8 grams (0.10 mole) of tris-(2,2,2-trifluoroethyl) phosphite and using octylmethylnaphthalene in place of triamylbenzene, there was obtained about 37 percent of the theoretical yield of product boiling at 72° C./2 mm., having a refractive index ($n_D^{20}$) of 1.3291 and a specific gravity ($d_{20}^{20}$) of 1.631

*Analysis.* — Calc'd for $C_3F_7CH_2CH_2PO(OCH_2CF_3)$: C, 24.42; H, 1.82; P, 7.01. Found: C, 24.53; H, 2.02; P, 7.64.

*Example B–1.—Bis-(2,2,2-trifluoroethyl) n-butylphosphonate and 2,2,2-trifluoroethyl dibutylphosphonate*

The apparatus used was the same as in Example A–1 except that a reflux condenser replaced the thermometer well which was fitted into one of the necks of the smaller flask. The smaller flask was charged with 5 grams (0.204 gram atom) of magnesium metal turnings and the system was flamed dry in a stream of dry nitrogen gas. When the apparatus had cooled, anhydrous ether was added to the smaller flask and 27.4 grams (0.2 mole) of n-butyl bromide in 100 milliliters of anhydrous ether was poured into the 125-milliliter addition funnel. The system was placed under nitrogen atmosphere and stirring was begun in the smaller flask. The butyl bromide solution was added dropwise at such a rate as to maintain gentle reflux once the reaction had started; the addition required two hours. The reaction mixture was stirred for an additional hour, during which period 42.1 grams (0.15 mole) of bis-(2,2,2-trifluoroethyl) chlorophosphate in 150 milliliters of anhydrous ether was added to the larger flask. At the end of the stirring period, the n-butylmagnesium bromide solution was transferred to the 500-milliliter addition funnel by means of nitrogen pressure. The system was again placed under nitrogen atmosphere and the larger flask was cooled with an ice-bath. The n-butylmagnesium bromide solution was added to the stirring chlorophosphate solution during a period of 30 minutes, the ice-bath was removed and the reaction mixture was refluxed for three hours with stirring. At the beginning of the heating period the solution was almost black in color, corresponding to the color of the Grignard reagent. On continued heating the color changed to yellow and a precipitate was formed. Stirring was stopped after three hours and the mixture was refluxed overnight. The reaction mixture was hydrolyzed with 125 milliliters of 1:4 hydrochloric acid solution, which was added to the stirred, ice-cooled mixture over a period of 40 minutes. The ether layer was separated and the acid layer, now yellow in color, was extracted three times with 50-milliliter portions of ether. The ether failed to remove any color from the acid solution. The combined ether layers were dried over a mixture of Drierite and anhydrous magnesium sulfate for a period of 24 hours and the ether was removed by distillation from a Vigreux column. The residue was rectified under reduced pressure.

There was thus obtained 20.3 grams (45.4 percent of the theoretical yield) of bis-(2,2,2-trifluoroethyl) n-butylphosphonate, boiling at 53–53.3° C./2 mm., having a refractive index ($n_D^{20}$) of 1.3310.

Analysis.—Calculated for n-$C_4H_9PO(OCH_2CF_3)_2$: C, 31.81; H, 4.34; P, 10.26. Found: C, 32.06; H, 3.97; P, 10.26.

There was also obtained 10.2 grams (25.3 percent of the theoretical yield) of 2,2,2-trifluoroethyldibutylphosphonate, boiling at 80–81° C./1 mm., having a refractive index ($n_D^{20}$) of 1.4081.

Analysis.—Calculated for $(C_4H_9)_2PO(OCH_2CF_3)$: C, 44.44; H, 7.44; P, 11.48. Found: C, 44.31; H, 7.54; P, 11.49.

*Example B-2.—Bis-(2,2,2-trifluoroethyl) methylphosphonate*

Following the procedure of Example B-1, but reacting methylmagnesium bromide made from 4.8 grams (0.2 gram atom) of magnesium metal and methyl bromide gas with 44.2 grams (0.16 mole) of bis-(trifluoroethyl) chlorophosphate, there was obtained 10 grams (about 21 percent of the theoretical yield) of product, boiling at 51–52° C./4 mm., having a refractive index ($n_D^{20}$) of 1.3387.

Analysis.—Calculated for $C_2H_5PO(OCH_2CF_3)_2$: C, 23.07; H, 2.71; P, 11.91. Found: C, 23.26; H, 2.77; P, 11.85.

*Example B-3.—Bis-(2,2,2-trifluoroethyl) ethylphosphonate*

Following the procedure of Example B-1, but reacting ethylmagnesium bromide made from 4.1 grams (0.17 gram atom) of magnesium metal and 17.4 grams (0.16 mole) of ethyl bromide with 44.9 grams (0.15 mole) of bis-(trifluoroethyl) chlorophosphate, there was obtained about 16 percent of the theoretical yield of product, boiling at 41° C./1 mm., having a refractive index ($n_D^{20}$) of 1.3440 and a specific gravity ($d_{20}^{20}$) of 1.574

Analysis.—Calculated for $C_2H_5PO(OCH_2CF_3)_2$: C, 26.20; H, 3.28; P, 11.25. Found: C, 25.71; H, 3.19; P, 10.33.

*Example B-4.—Bis-(2,2,2-trifluoroethyl) propylphosphonate*

Following the procedure of Example B-1, but reacting n-propylmagnesium bromide made from 18.5 grams (0.15 mole) of n-propyl bromide and 5.0 grams (0.2 gram atom) of magnesium metal turnings with 42.1 grams (0.15 mole) of bis-(trifluoroethyl) chlorophosphate, there was obtained approximately 14 percent of the theoretical yield of product, boiling at 50–53° C./1 mm., having a refractive index ($n_D^{20}$) of 1.3526.

Analysis.—Calculated for n-$C_3H_7PO(OCH_2CF_3)_2$: C, 29.16; H, 3.88. Found: C, 29.31; H, 3.93.

*Example B-5.—Bis-(2,2,2-trifluoroethyl) isobutylphosphonate*

Following the procedure of Example B-1, but reacting isobutylmagnesium bromide made from 27.4 grams (0.2 mole) of isobutyl bromide and 5 grams (0.2 gram atom) of magnesium metal turnings with 47.2 grams of bis-(trifluoroethyl) chlorophosphate, there was obtained about 38 percent of the theoretical yield of product, boiling at 63–64° C./2 mm., having a refractive index ($n_D^{20}$) of 1.3585.

Analysis.—Calculated for iso-$C_4H_9PO(OCH_2CF_3)_2$: C, 31.81; H, 4.34; P, 10.26. Found: C, 31.48; H, 4.04; P, 10.22.

*Example B-6.—Bis-(2,2,2-trifluoroethyl) sec-butylphosphonate*

Following the procedure of Example B-1, but reacting sec-butylmagnesium bromide made from 21.92 grams (0.15 mole) of sec-butyl bromide and 5.1 grams (0.205 gram atom) of magnesium metal turnings with 44.2 grams (0.16 mole) of bis-(trifluoroethyl) chlorophosphate, there was obtained 19.5 grams of product (approximately 43 percent of the theoretical yield, boiling at 39–41° C./1 mm., having a refractive index ($n_D^{20}$) of 1.347.

Analysis.—Calculated for sec-$C_4H_9PO(OCH_2CF_3)_2$: C, 31.81; H, 4.34; P, 10.36. Found: C, 27.76; H, 3.41; P, 10.27.

*Example B-7.—Bis-(2,2,2-trifluoroethyl) 3,3,4,4,5,5,5-heptafluoropentylphosphonate*

Following the procedure of Example B-1, but reacting 3,3,4,4,5,5,5-heptafluoropentylmagnesium bromide, obtained from 41.5 grams (0.15 mole) of the corresponding heptafluoropentyl bromide and 5.1 grams (0.21 gram atom) of magnesium metal with 42.1 grams of bis-(trifluoroethyl) chlorophosphate, there was obtained 27.2 grams (about 41 percent of the theoretical yield) of product, boiling at 77° C./2 mm., having a refractive index ($n_D^{20}$) of 1.3291.

Analysis.—Calcd. for $C_3F_7CH_2CH_2PO(OCH_2CF_3)_2$: C, 24.42; H, 1.82; P, 7.01. Found: C, 24.61; H, 2.14; P, 7.61.

Among the other fluorine-containing dialkyl alkylphosphonate esters of the present invention which can be prepared by the methods of the preceding examples are:

$CH_3PO(OCH_2C_2F_5)_2$, $C_5H_{11}PO(OCH_2C_3F_7)_2$ $C_9H_{19}PO(OCH_2C_4F_9)_2$, $C_3H_7PO(OCH_2C_7F_{15})_2$ iso-$C_4H_9PO(OCH_2C_8F_{17})_2$, $CH_3PO(OCH_2CH_2CF_3)_2$ $C_{11}H_{23}PO(OC_4H_8C_2F_5)_2$, $C_2H_5PO(OC_6H_{12}C_7F_{15})_2$ $C_6F_{13}C_3H_6PO(OCH_2C_2F_5)_2$ $C_8F_{17}C_5H_{10}PO(OC_4H_8C_3F_7)_2$ $CF_3CH_2PO(OC_8H_{16}C_6F_{13})_2$ iso-$C_4F_9C_2H_4PO(OCH_2CF_3)_2$ $(CH_3)_2PO(OCH_2C_2F_5)$, $(C_5H_{11})_2PO(OCH_2C_3F_7)$ Thus, by reacting methyllithium and tris-(2,2,3,3-pentafluoropropyl) phosphite following the procedure of Example A-1, or by reacting methylmagnesium bromide and bis-(2,2,3,3,3-pentafluoropropyl) chlorophosphate following the procedure of Example B-1, the esters bis-(2,2,3,3,3-pentafluoropropyl) methylphosphonate and 2,2,3,3,3-pentafluoropropyl dimethylphosphonate may be obtained.

By reacting $C_{11}H_{23}Li$ and $(C_2F_5C_4H_8O)_3P$ following the procedure of Example A-1, or by reacting $C_{11}H_{23}MgBr$ and $(C_2F_5C_4H_8O)_2POCl$ following the procedure of Example B-1, the ester $C_{11}H_{23}PO(OC_4H_8C_2F_5)_2$ may be obtained.

By reacting $CF_3CH_2Li$ and $(C_6F_{13}C_8H_{16}O)_3P$ following the procedure of Example B-1, the ester $$CF_3CH_2PO(OC_8H_{16}C_6F_{13})_2$$

may be obtained.

The following reaction illustrates the hydrolysis of the fluorine-containing dialkyl alkylphosphonates of the present invention to the corresponding phosphonic acids.

REACTION 1.—n-BUTYLPHOSPHONIC ACID

A mixture of ten grams of bis-(2,2,2-trifluoroethyl) n-butylphosphonate and 25 milliliters of hydrochloric acid was refluxed for 20 hours. The reaction mixture was then poured into a separatory funnel where it formed two layers. The upper water layer was evaporated and yielded approximately one gram of the acid, which after recrystallization from ligroin melted at 103–104 degrees centigrade.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A lower-perfluoroalkyl-substituted dialkyl alkane phosphonate.
2. A dialkyl lower-perfluoroalkyl-substituted alkane phosphonate.
3. A di(lower-perfluoroalkyl substituted)alkyl alkane phosphonate.
4. A di(lower-perfluoroalkyl substituted)alkyl lower-perfluoroalkyl-substituted alkane phosphonate.
5. Bis-(2,2,2-trifluoroethyl)butanephosphonate.
6. Dibutyl 2,2,2-trifluoroethane phosphonate.
7. Bis-(2,2,2-trifluoroethyl) 3,3,4,4,5,5,5-heptafluoropentane phosphonate.
8. Bis-(2,2,3,3,3-pentafluoropropyl)methanephosphonate.
9. Bis-(2,2,2-trifluoroethyl)propanephosphonate.
10. The process for making lower-perfluoroalkyl-substituted dialkyl alkanephosphonate esters which includes: reacting, in the presence of a moderating organic solvent, a compound selected from the group consisting of alkyl lithium compounds and lower-perfluoroalkyl-substituted alkyl lithium compounds with a tris-(lower-perfluoroalkyl-substituted alkyl) phosphite at reflux temperatures, and oxidizing the reaction product thus obtained.
11. The process for making lower-perfluoroalkyl-substituted dialkyl alkanephosphonate esters which includes: reacting, in the presence of a moderating organic solvent, a compound selected from the group consisting of alkyl lithium compounds and lower-perfluoroalkyl-substituted alkyl lithium compounds with a tris-(lower-perfluoroalkyl-substituted-alkyl) phosphite at reflux temperatures, adding to the reaction product an inert liquid hydrocarbon pusher having a boiling point greater than the boiling point of the desired ester end-product, and oxidizing the reaction product thus obtained.
12. The process for making lower-perfluoroalkyl-substituted dialkyl alkanephosphonate esters which includes: reacting, in the presence of a moderating organic solvent, a compound selected from the group consisting of alkyl lithium compounds and lower-perfluoroalkyl-substituted alkyl lithium compounds with a tris-(lower-perfluoroalkyl-substituted-alkyl) phosphite at reflux temperatures, adding to the reaction product an inert liquid hydrocarbon boiling above the boiling point of the desired ester product, fractionally distilling the reaction mixture to obtain the phosphonite ester, and oxidizing the phosphonite ester thus obtained.
13. The process for making lower-perfluoroalkyl-substituted dialkyl alkanephosphonate esters which includes: refluxing, in the presence of a moderating organic solvent, a compound selected from the group consisting of alkyl magnesium halides and lower-perfluoroalkyl-substituted alkyl magnesium halides with a bis-(lower-perfluoroalkyl-substituted-alkyl) halophosphate, and hydrolyzing the resultant reaction mixture with a dilute acid at reflux temperatures.
14. The process for making lower-perfluoroalkyl-substituted dialkyl alkanephosphonate esters which includes: reacting, refluxing, in the presence of a moderating organic solvent, a compound selected from the group consisting of alkyl magnesium halides and lower-perfluoroalkyl-substituted alkyl magnesium halides with a bis-(lower-perfluoroalkyl-substituted-alkyl) chlorophosphate, hydrolyzing the resultant reaction mixture with a dilute acid, and recovering the desired ester by distillation at reflux temperatures.

References Cited in the file of this patent

UNITED STATES PATENTS

| | | |
|---|---|---|
| 2,559,754 | Bittles et al. | July 10, 1951 |
| 2,708,204 | Bell et al. | May 10, 1955 |

OTHER REFERENCES

Saunders et al.: "J. Chem. Soc." (1948), pp. 699–703.
Burger et al.: "J. Org. Chem.," vol. 16, pp. 1250–1254 (1951).

UNITED STATES PATENT OFFICE
CERTIFICATE OF CORRECTION

Patent No. 2,899,454                                    August 11, 1959

Earl T. McBee et al.

It is hereby certified that error appears in the printed specification of the above numbered patent requiring correction and that the said Letters Patent should read as corrected below.

Column 3, line 8, for "additional" read -- addition --; column 6, line 42, for "$C_3F_7CH_2CH_2PO(OCH_2CF_3)$" read -- $C_3F_7CH_2CH_2PO(OCH_2CF_3)_2$ --; column 7, line 42, for "$C_2H_5PO(OCH_2CF_3)_2$" read -- $CH_3PO(OCH_2CF_3)_2$ --; column 10, line 32, strike out "reacting".

Signed and sealed this 13th day of September 1960.

(SEAL)

Attest:
KARL H. AXLINE
Attesting Officer

ROBERT C. WATSON
Commissioner of Patents